W. T. LYON.
HANDPIECE FOR DENTAL MACHINES.
APPLICATION FILED OCT. 29, 1914. RENEWED AUG. 9, 1916.
1,205,553.
Patented Nov. 21, 1916.
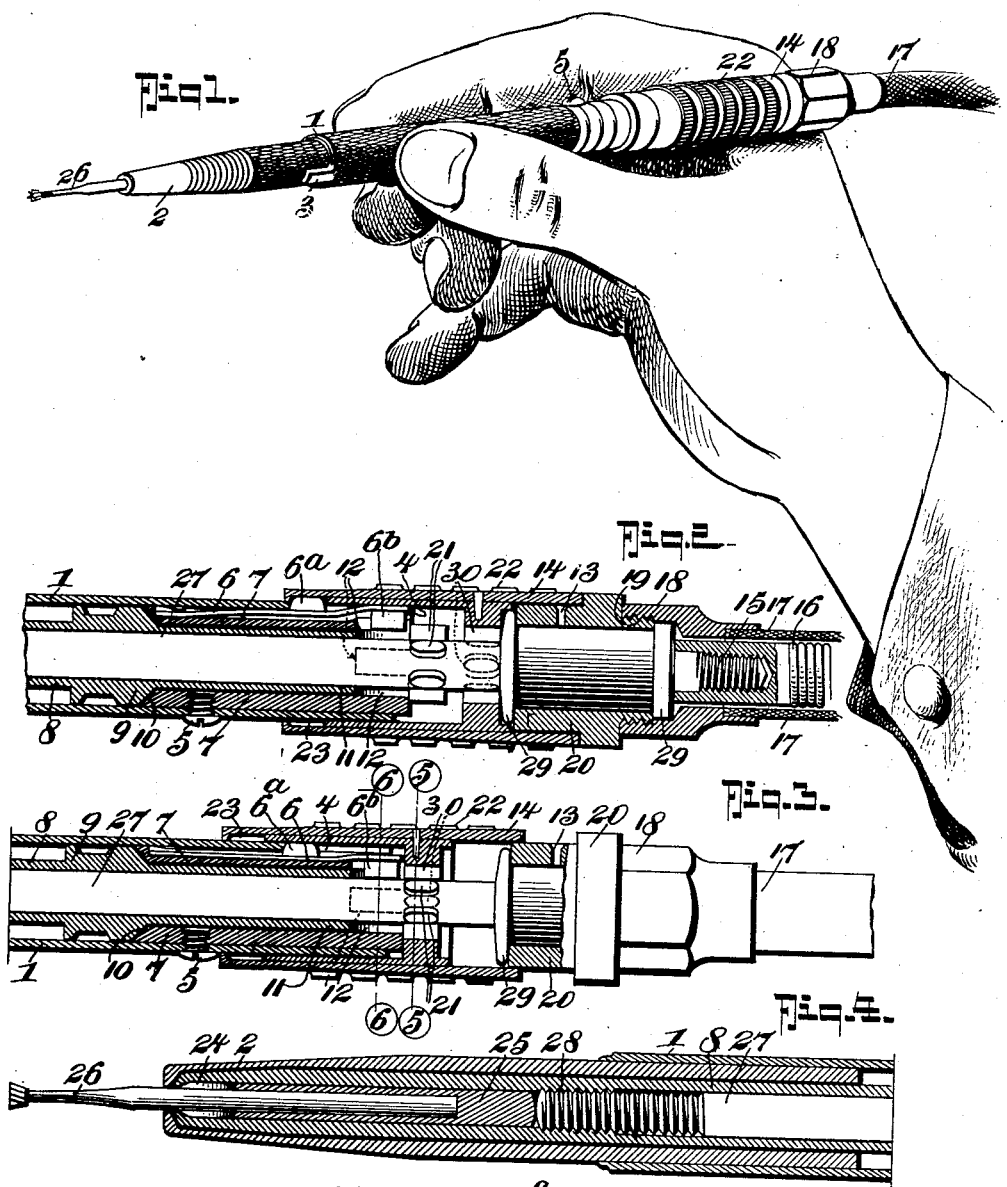
WITNESSES:
John E. Schrott
Mae E. Immich
INVENTOR
W. T. Lyon.
BY
Fred G. Dieterich Co.
ATTORNEYS.

UNITED STATES PATENT OFFICE.

WILLIAM T. LYON, OF PORTLAND, OREGON.

HANDPIECE FOR DENTAL MACHINES.

1,205,553.             Specification of Letters Patent.    Patented Nov. 21, 1916.

Application filed October 29, 1914, Serial No. 869,296.  Renewed August 9, 1916.  Serial No. 114,068.

*To all whom it may concern:*

Be it known that I, WILLIAM T. LYON, residing at Portland, in the county of Multnomah and State of Oregon, have invented certain new and useful Improvements in Handpieces for Dental Machines, of which the following is a specification.

The present invention relates to an improved hand piece for dental machines of the type disclosed in my Patent #987732 issued March 28, 1911, and in its generic nature, my invention embodies an improved construction of parts designed to reduce the cost of manufacture and to render the device more effective in its operation.

The present invention is a modification of the invention disclosed in my co-pending application filed September 15, 1914, Serial #861,861, and in its more detail nature includes those novel features of construction, combination and arrangement of parts, all of which will be first fully described, then be specifically pointed out in the appended claims and illustrated in the accompanying drawing, in which:

Figure 1 is a perspective view illustrating the invention in use. Fig. 2 is a vertical section and part elevation of the invention. Fig. 3 is an enlarged vertical section of the rear end of the hand piece. Fig. 4 is an enlarged vertical section of the front or chuck end of the hand piece. Figs. 5 and 6 are cross sections on the line 5—5 and 6—6 of Fig. 3.

In the drawing, in which like numerals and letters of reference indicate like parts in all of the figures, 1 represents the outer casing which is coned at its forward end, as at 2, and is provided with a nib 3 for convenience in securing angle attachments (not shown). The casing 1 is bored near its inner end to receive a screw 5 by which it is fastened to the bearing member 7, into which bearing member the screw 5 is tapped. The bearing member 7 is recessed to receive a latch 6 which has a lug $6^a$ that projects through a slot 4 in the casing 1 and it also has a clutch lug $6^b$ to project into one of a series of slots 12 in the rear end of the hollow shaft 8. The hollow shaft 8 has a collar 9 that preferably has a tapering fit at 10 with the bearing 7, and the end of the hollow shaft 8 is slotted to form a clutch element 12.

The flexible driving shaft 16 is screwed at 15 to the end of the rod 27 and it is held within the usual casing 17 that is connected by a union 18 to a projection 19 of a tubular bearing 20. The bearing 20 has an oil hole 13 and it is adapted to receive the end of the shiftable sleeve 14. The sleeve 14 has a milled portion 22 to afford a convenient grip.

The sleeve 14 is provided with a clutch element 30 which coöperates with the clutch lugs 21 on the rod 27 when such clutch elements 30 and 21 are in engagement, as will later appear, so that rotation of the rod 27 can be effected by turning the sleeve 14. The sleeve 14 has an annular groove 23 to receive the latch lug $6^a$ when the clutch end $6^b$ of the latch is to be withdrawn from the clutch slots 12 (see Fig. 2).

The front end of the hollow shaft 8 is internally coned as indicated, to coöperate with the split fingers 24 of the chuck 25. The chuck 25 is held within the hollow shaft and is adapted to receive the tool 26.

The rod 27 abuts the chuck 25 and has a threaded engagement as at 28 with the hollow shaft 8, so that by turning the rod 27, with relation to the hollow shaft 8, the chuck 25 can be forced to its gripping position, or released, as desired.

When the parts are positioned, as shown in Fig. 2, with the shiftable sleeve 14 retracted, the rotary drive shaft 16 will impart a turning motion to the rod 27 and sleeve 8 to rotate the drill. In order to release the drill chuck 25 from its gripping action, the sleeve 14 is held forwardly, thus causing the clutch lug $6^b$ to engage any one of the clutch elements 12 and lock the hollow shaft from rotation, and at the same time the clutch elements 30—21 are brought into engagement so that by turning the sleeve 14 in one direction, the rod 27 can be unthreaded to release tension on the chuck and conversely turning the sleeve 14 in the other direction threads the rod 27 into the hollow shaft 8 to force the chuck 25 to its tool gripping position.

The rod 27 is held in a relatively fixed position with relation to the bearing 20 by collars 29.

While the outer casing 1 is shown with its front end as a separate section (see Fig. 4) the parts numbered 1 and 2 in Fig. 4, are preferably permanently united by braising or in any other suitable way, the same not forming, *per se*, a part of the present invention.

From the foregoing description taken in connection with the accompanying drawings, it is thought the construction and advantages of my invention will be readily understood by those skilled in the art to which the invention appertains.

What I claim is:

1. In a dental hand piece, a bearing member, an outer shell or casing secured thereto and having a tool opening in its front end, a hollow shaft rotatable in said shell and projecting through said bearing, said hollow shaft having its outer end internally coned and apertured to receive the tool, a chuck in said hollow shaft adjacent to said coned end, a thrust rod in said hollow shaft, a threaded connection between said thrust rod and said hollow shaft, a flexible drive shaft connected to said thrust rod for effecting driving rotation of the same, means for holding said hollow shaft from rotation and means for engaging said thrust rod, said last named means being rotatably mounted whereby said thrust rod may be turned to secure or release the chuck.

2. In a dental hand piece, a bearing member, a casing in which said bearing member is mounted, a hollow shaft mounted in said casing and projecting through said bearing member, a tool chuck in said hollow shaft, a thrust rod for operating said tool chuck, a threaded connection between said thrust rod and said hollow shaft, whereby said thrust rod may be longitudinally moved within said hollow shaft, a latch device for latching said hollow shaft to said bearing at times to prevent rotation of said hollow shaft, said latch device lying normally out of action, means for imparting rotation to said thrust rod and thereby rotate said thrust rod and said hollow shaft, and a shiftable sleeve mounted on said casing and adapted to engage said latch member whereby when said sleeve is shifted in one direction said latch member will be forced to its latching position.

3. In a dental hand piece, a bearing member, a casing in which said bearing member is mounted, a hollow shaft mounted in said casing and projecting through said bearing member, a tool chuck in said hollow shaft, a thrust rod for operating said tool chuck, a threaded connection between said thrust rod and said hollow shaft, whereby said thrust rod may be longitudinally moved within said hollow shaft, a latch device for latching said hollow shaft to said bearing at times to prevent rotation of said hollow shaft, said latch device lying normally out of action, means for imparting rotation to said thrust rod and thereby rotate said thrust rod and said hollow shaft, a shiftable sleeve mounted on said casing and adapted to engage said latch member whereby when said sleeve is shifted in one direction said latch member will be forced to its latching position, said thrust rod and said shiftable sleeve having coöperating clutch elements adapted to be brought into and out of engagement with one another whereby when said clutch elements are in engagement and said latch is in its latching position, said thrust rod can be turned with relation to said casing to secure or release said chuck.

4. In a dental hand piece, a casing, a hollow shaft rotatably mounted in said casing, a latch device relatively fixedly located with relation to said casing, a chuck mounted in said hollow shaft, a thrust rod in said hollow shaft, a threaded connection between said thrust rod and said hollow shaft for imparting thrust movements to said rod, said hollow shaft having a slot, said latch having a clutch lug to engage in said slot when said latch is depressed, a shiftable sleeve mounted on said casing, a coöperative connection between said sleeve and said latch whereby said latch will normally lie out of its latching position and upon shifting said sleeve, said latch will be forced into its latching position, and means for imparting rotation to said thrust rod.

5. In a dental hand piece, a casing, a hollow shaft rotatably mounted in said casing, a latch device relatively fixedly located with relation to said casing, a chuck mounted in said hollow shaft, a thrust rod in said hollow shaft, a threaded connection between said thrust rod and said hollow shaft for imparting thrust movements to said rod, said hollow shaft having a slot, said latch having a clutch lug to engage in said slot when said latch is depressed, a shiftable sleeve mounted on said casing, a coöperative connection between said sleeve and said latch whereby said latch will normally lie out of its latching position and upon shifting said sleeve said latch will be forced into its latching position, means for imparting rotation to said thrust rod, said thrust rod having a bearing portion to which said rotation imparting means is attached, a bearing for receiving said bearing portion, said bearing having a projection on which said sleeve is also slidable, said sleeve and said thrust rod having coöperating clutch elements adapted to be brought into and out of engagement with one another whereby when said elements are in engagement and said latch is depressed, said thrust rod may be turned to move said chuck into its clutching or tool releasing position, substantially as shown and described.

WILLIAM T. LYON.

Witnesses:
 ARTHUR H. LEWIS,
 A. T. LEWIS.